J. E. LANGDON.
VALVE.
APPLICATION FILED APR. 30, 1915.
1,201,203. Patented Oct. 10, 1916.
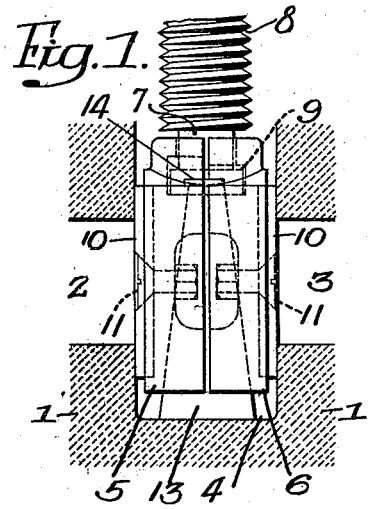
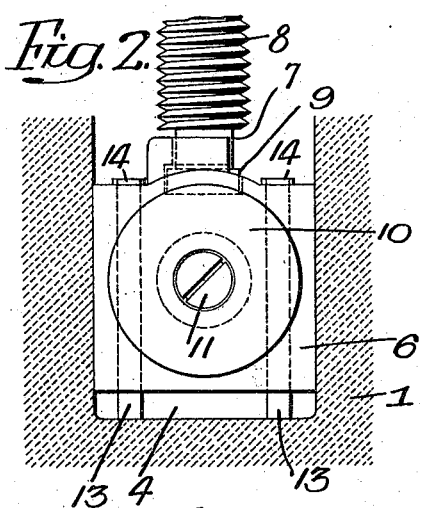
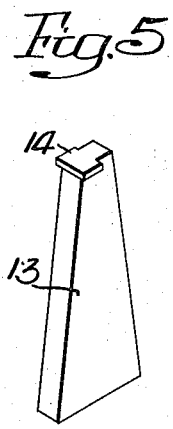
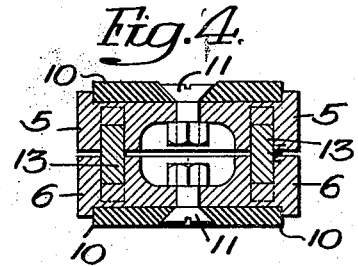
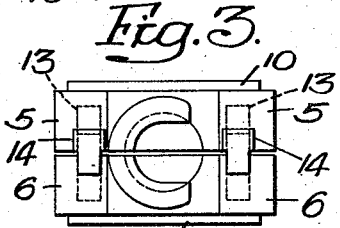
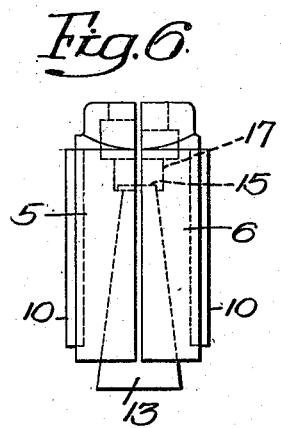
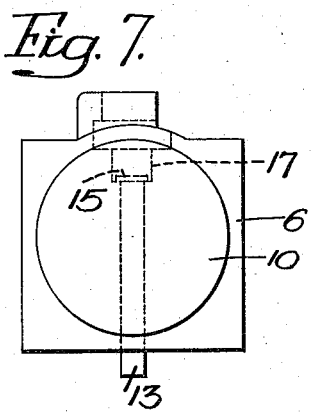
Inventor:—
James E. Langdon.
by his Attorneys:—
Howson & Howson

UNITED STATES PATENT OFFICE.

JAMES E. LANGDON, OF PHILADELPHIA, PENNSYLVANIA, ASSIGNOR OF ONE-HALF TO CHARLES HOWELL COOK, OF TRENTON, NEW JERSEY.

VALVE.

1,201,203.  Specification of Letters Patent.  Patented Oct. 10, 1916.

Application filed April 30, 1915. Serial No. 25,040.

*To all whom it may concern:*

Be it known that I, JAMES E. LANGDON, a citizen of the United States, residing in Philadelphia, Pennsylvania, have invented certain Improvements in Valves, of which the following is a specification.

One object of my invention is to provide a gate valve with novel means whereby the sections of the valve proper may be spread or expanded to cause them to make liquid tight joints with the edges of the openings forming the seats of the valve, the invention contemplating a novel arrangement and construction of wedges for accomplishing this object.

I further desire to provide a gate valve with novel means for retaining its packing rings in place which will permit of the convenient and easy replacing of said rings when this is desirable for any reason.

Another object of the invention is to provide a sectional gate valve with novel means for separating or spreading its sections when it is required that they shall be seated in order to cut off fluid flow, the arrangement of parts being simple, inexpensive and substantial.

These objects and other advantageous ends I secure as hereinafter set forth, reference being had to the accompanying drawings in which, Figure 1 is a vertical section of the body or casing of a gate valve showing my invention as applied thereto; Fig. 2 is a vertical section taken at right angles to Fig. 1; Fig. 3 is a plan of the valve shown in Figs. 1 and 2; Fig. 4 is a central horizontal section of the valve shown in Figs. 1 and 2; Fig. 5 is a perspective view of one of the wedges employed for separating the valve; and Figs. 6 and 7 are respectively front and side elevations of a valve employing but a single separating wedge.

In the above drawings 1 represents a portion of the body or casing of a gate valve having a through passage 2—3 of circular cross section intersected by a cavity 4 extending at right angles. This latter cavity is substantially rectangular in section and serves as a guideway for a valve in the form of a gate. Said valve consists of two sections 5 and 6 identical in construction except that they are provided with undercut recesses at the top, each designed to receive half of the headed end 7 of an operating rod or spindle 8. While one of these cavities closely fits the head 9 of this end, the other is so made as to fit it loosely with the result that when the valve spindle is moved longitudinally such motion is at once communicated to the valve section 6 and after this has moved to a certain extent, the valve section 5 is moved.

Each of the valve sections consists of a flat block of substantially square outline, having in one face a circular recess for the reception of a seat ring 10 in the shape of a flat washer-like body of packing held in place by the counter-sunk head of a screw bolt 11, which passes through the valve section into a cavity 12 thereof, where it is engaged by a nut. For spreading the valve sections, I provide two wedges 13 consisting of flat pieces of metal each having at its narrow end a transversely extending head 14. Each of these wedges is mounted in a recess partly formed in both of the adjacent faces of the valve sections 5 and 6 so as to lie in a plane at right angles to the plane of the faces of said sections, the arrangement of parts being such that the head portions 14 of the wedges rest on the top surface of the valve sections so as to keep the wedges from falling out while the latter are of such length that they project for some distance below the bottoms of the valve sections.

When the valve sections are applied to the headed end 7 of the valve spindle, they are suspended therefrom and move freely downward in the cavity 4 of the valve body when said spindle is suitably operated. At or slightly before the valve sections reach such a point that the center lines of their circular seat rings coincide with the center line of the passage 2—3, the lower ends of the wedges 13 strike the bottom of the cavity so that as the sections are forced down by the continued turning of the spindle, said wedges act to move them apart, thus forcing their packing rings 10 into intimate engagement with the edges of the openings to said passage and cutting off the flow of fluid therefrom into or from the cavity 4.

When it is desired to open the valve the upward movement of the spindle 8 first moves up the valve section 6, thus drawing it away from the wedges and moving its seat or packing ring out of engagement with the seat surrounding the part 3 of the passage. Immediately thereafter the continued upward movement of the valve stem causes the head 9 to engage and draw up the valve section 5 so that both of said sections are free to swing together and to move upwardly so as to permit of flow of fluid through the passage 2—3.

In that form of my invention shown in Figs. 6 and 7 I have so arranged the parts that a single wedge 13 is employed in place of the two wedges, which in Figs. 1 and 2 were shown as operative on parts of the valve sections on opposite sides of a line through the center of their packing rings. In this latter case however, the single wedge is so mounted that it operates in a vertical plane through the center line of the valve having its head 15 operative in a centrally formed cavity 17. In this case as before the wedge projects below the bottom of the valve sections so as to strike the bottom of the cavity 4 of the valve body when the valve spindle is turned to lower said sections and under these conditions it separates them so as to force the packing rings into a fluid-tight engagement with those parts of the wall of the cavity 4 immediately surrounding the openings into the parts 2—3 of the passage in the body.

In order that my valve may be available for use to control the flow of acids, alkalis or other corrosive liquids, I preferably make the body or casing 1 of porcelain, and while the valve sections and their associated parts are likewise preferably made of porcelain, they may also be made of metal in which case they could be conveniently and quickly replaced in case by continued use they should become corroded to an objectionable extent.

I claim:—

1. The combination of a valve casing having a fluid passage therein; a valve in said casing formed in two structurally independent sections; a removable packing ring carried on the face of each section; a retaining bolt for each ring having a removable nut operative in a cavity of its section; and means for actuating said sections to cause their packing rings to respectively seat around the openings to the passage in the casing.

2. The combination of a valve casing having a fluid passage therein; a valve in said casing formed in two sections; a wedge having a head at its small end suspending it from the upper part of said sections and mounted with its large end extending below them; with means for forcibly moving the sections to cause the wedge to separate them into positions in which they will seat upon the portions of the valve casing adjacent the openings into the passage thereof.

3. The combination of a valve casing having a fluid passage therein; a valve in said casing formed in two sections; wedges headed at their small ends and extending in recesses formed in the sections from the top to the bottom thereof, the heads of said wedges being placed to engage the upper portions of the valve sections; with means for longitudinally moving the sections to bring the wedges into engagement with portions of the casing and seat the valve sections to close the passage in the casing.

JAMES E. LANGDON.

Copies of this patent may be obtained for five cents each, by addressing the "Commissioner of Patents, Washington, D. C."